(12) United States Patent
Wright et al.

(10) Patent No.: US 7,858,693 B2
(45) Date of Patent: *Dec. 28, 2010

(54) UNHYDROGENATED BLOCK COPOLYMER COMPOSITIONS

(75) Inventors: Kathryn J. Wright, Katy, TX (US); Carl L. Willis, Houston, TX (US); Dale L. Handlin, Jr., Houston, TX (US)

(73) Assignee: KratonPolymers U.S. LLC, Houston, TX (US)

( * ) Notice: Subject to any disclaimer, the term of this patent is extended or adjusted under 35 U.S.C. 154(b) by 735 days.

This patent is subject to a terminal disclaimer.

(21) Appl. No.: 11/388,628

(22) Filed: Mar. 24, 2006

(65) Prior Publication Data

US 2007/0225427 A1    Sep. 27, 2007

(51) Int. Cl.
*C08L 9/06* (2006.01)
*C08L 53/02* (2006.01)

(52) U.S. Cl. .......................... 524/505; 525/88; 525/89; 525/98; 525/99; 525/242

(58) Field of Classification Search ................. 524/505; 525/88, 89, 98, 99, 242
See application file for complete search history.

(56) References Cited

U.S. PATENT DOCUMENTS

| | | |
|---|---|---|
| 3,149,182 A | 9/1964 | Porter |
| 3,369,160 A | 2/1968 | Koppel et al. |
| RE27,145 E | 6/1971 | Jones |
| 3,595,942 A | 7/1971 | Wald et al. |
| 3,634,549 A | 1/1972 | Shaw et al. |
| 3,670,054 A | 6/1972 | De La Mare et al. |
| 3,700,633 A | 10/1972 | Wald et al. |
| 3,766,295 A | 10/1973 | Crossland et al. |
| 4,039,593 A | 8/1977 | Kamienski et al. |
| 4,122,134 A | 10/1978 | Miki et al. |
| 4,167,545 A | 9/1979 | Fahrbach et al. |
| 4,248,981 A | 2/1981 | Milkovich et al. |
| 4,391,949 A | 7/1983 | St. Clair |
| 4,418,180 A * | 11/1983 | Heinz et al. ................. 525/314 |
| 4,444,953 A | 4/1984 | St. Clair |
| 4,578,429 A | 3/1986 | Gergen et al. |
| 4,788,361 A | 11/1988 | Olson et al. |
| 4,882,384 A | 11/1989 | Willis et al. |
| 4,898,914 A | 2/1990 | Gergen et al. |
| 4,925,899 A | 5/1990 | Rendina et al. |
| 4,970,265 A | 11/1990 | Willis |
| 5,206,300 A | 4/1993 | Chamberlain |
| 5,274,036 A | 12/1993 | Korpman et al. |
| 5,276,101 A | 1/1994 | Chamberlain et al. |
| 5,436,298 A | 7/1995 | Moczygemba et al. |
| 5,506,299 A | 4/1996 | Gelles et al. |
| 5,516,831 A | 5/1996 | Pottick et al. |
| 5,545,690 A * | 8/1996 | Trepka et al. ................. 525/98 |
| 5,587,237 A | 12/1996 | Korpman et al. |
| 5,693,718 A | 12/1997 | De Groot et al. |
| 5,705,569 A | 1/1998 | Moczygemba et al. |
| 5,760,135 A | 6/1998 | Korpman et al. |
| 5,910,546 A | 6/1999 | Trepka et al. |
| 6,031,053 A | 2/2000 | Knoll et al. |
| 6,096,828 A | 8/2000 | DePorter et al. |
| 6,197,889 B1 | 3/2001 | Knoll et al. |
| 6,265,485 B1 | 7/2001 | Trepka et al. |
| 6,420,486 B1 | 7/2002 | DePorter et al. |
| 6,492,469 B2 | 12/2002 | Willis et al. |
| 6,521,712 B1 | 2/2003 | Knoll et al. |
| 6,593,430 B1 | 7/2003 | Knoll et al. |
| 6,759,454 B2 | 7/2004 | Stephens et al. |
| 6,987,142 B2 | 1/2006 | St. Clair et al. |
| 7,001,956 B2 | 2/2006 | Handlin, Jr. et al. |
| 7,012,118 B2 | 3/2006 | Hansen et al. |
| 7,067,589 B2 | 6/2006 | Bening et al. |
| 7,084,347 B2 | 8/2006 | Mhetar et al. |
| 7,138,456 B2 | 11/2006 | Bening et al. |
| 7,141,621 B2 | 11/2006 | St. Clair et al. |
| 7,169,850 B2 | 1/2007 | Handlin, Jr. et al. |
| 7,217,885 B2 | 5/2007 | Mhetar et al. |
| 7,217,886 B2 | 5/2007 | Mhetar et al. |
| 7,220,917 B2 | 5/2007 | Mhetar et al. |
| 7,223,816 B2 | 5/2007 | Handlin, Jr. et al. |
| 7,226,484 B2 | 6/2007 | Chen |
| 7,244,785 B2 | 7/2007 | Bening et al. |
| 7,267,855 B2 | 9/2007 | Handlin, Jr. et al. |
| 7,282,536 B2 | 10/2007 | Handlin, Jr. et al. |
| 7,290,367 B2 | 11/2007 | Chen |
| 7,332,677 B2 | 2/2008 | Xu et al. |
| 2003/0166776 A1 | 9/2003 | Wright et al. |

(Continued)

FOREIGN PATENT DOCUMENTS

CA    716 645    8/1965

(Continued)

*Primary Examiner*—Roberto Robago
(74) *Attorney, Agent, or Firm*—Michael A. Masse; Novack Druce & Quigg, LLP

(57) ABSTRACT

The present invention relates to novel compositions comprising (a) anionic block copolymers having at least two blocks of a mono alkenyl arene and at least one block of a conjugated diene and mono alkenyl arene having a specific arrangement of the monomers in the copolymer block, and (b) tailored softening modifiers have a particular structure that results in a surprising improvement in properties for the composition. Also included are processes for the manufacturing such novel compositions and various end-uses and applications for such compositions.

17 Claims, 1 Drawing Sheet

U.S. PATENT DOCUMENTS

| | | |
|---|---|---|
| 2003/0176582 A1 | 9/2003 | Bening et al. |
| 2003/0181584 A1 | 9/2003 | Handlin, Jr. et al. |
| 2004/0138371 A1 | 7/2004 | St. Clair et al. |
| 2005/0171290 A1 | 8/2005 | Bening et al. |
| 2005/0285086 A1 | 12/2005 | Kosaka et al. |
| 2005/0288406 A1 | 12/2005 | Gallucci et al. |
| 2006/0106139 A1 | 5/2006 | Kosaka et al. |
| 2006/0131053 A1 | 6/2006 | Kubo et al. |
| 2006/0134416 A1 | 6/2006 | Kubo et al. |
| 2006/0135661 A1 | 6/2006 | Mhetar et al. |
| 2006/0135695 A1 | 6/2006 | Guo et al. |
| 2006/0182967 A1 | 8/2006 | Kosaka et al. |
| 2006/0205849 A1 | 9/2006 | St. Clair |
| 2006/0205904 A1 | 9/2006 | St. Clair |
| 2007/0028835 A1 | 2/2007 | Yamauchi et al. |
| 2007/0197949 A1 | 8/2007 | Chen |
| 2007/0225428 A1 | 9/2007 | Bening et al. |
| 2007/0225429 A1 | 9/2007 | Wright et al. |
| 2008/0015306 A1 | 1/2008 | Wright et al. |

FOREIGN PATENT DOCUMENTS

| | | |
|---|---|---|
| WO | 2004/108784 A1 | 12/2004 |
| WO | 2005/097900 A1 | 10/2005 |
| WO | 2006/065497 A1 | 2/2006 |
| WO | 2006065502 A1 | 6/2006 |
| WO | 2006065519 A1 | 6/2006 |
| WO | 2006/088707 A1 | 8/2006 |
| WO | 2007111853 A1 | 10/2007 |

* cited by examiner

Figure#1
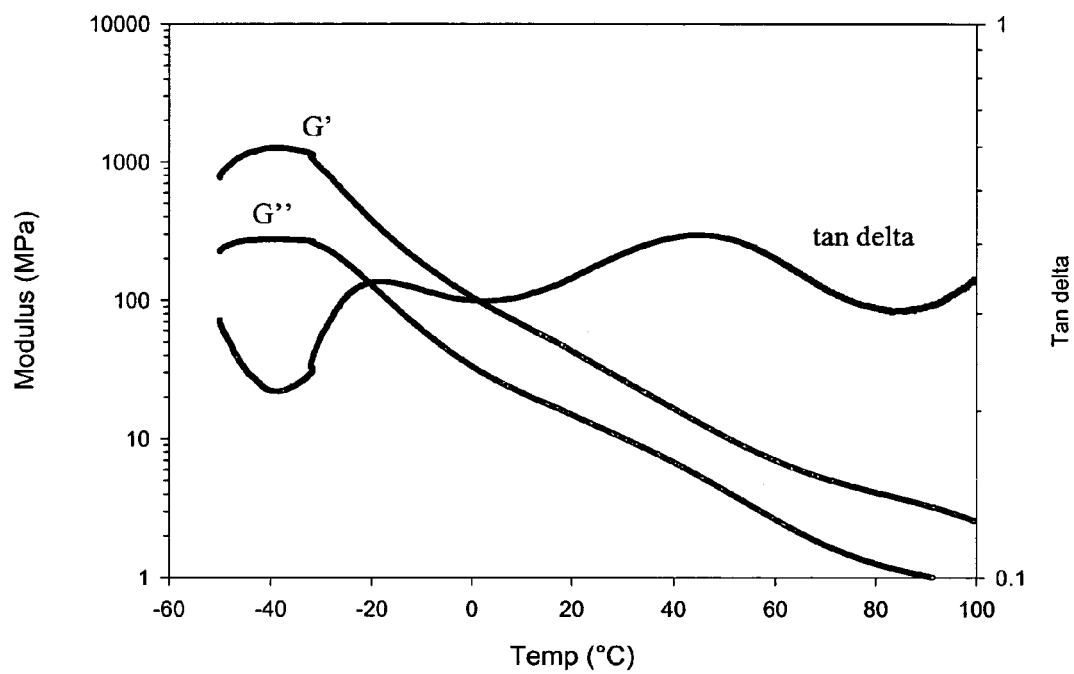
Dynamic mechanical spectra of Formulation 5.7

UNHYDROGENATED BLOCK COPOLYMER COMPOSITIONS

FIELD OF THE INVENTION

This invention relates to novel compositions comprising (a) anionic block copolymers of mono alkenyl arenes and conjugated dienes having two or more polymer blocks of a mono alkenyl arene and one or more blocks of a copolymer of a conjugated diene and mono alkenyl arene, and (b) tailored softening modifiers which have a particular structure that results in a surprising improvement in properties for the composition.

BACKGROUND OF THE INVENTION

The preparation of block copolymers is well known. In a representative synthetic method, an initiator compound is used to start the polymerization of one monomer. The reaction is allowed to proceed until all of the monomer is consumed, resulting in a living homopolymer. To this living homopolymer is added a second monomer that is chemically different from the first. The living end of the first polymer serves as the site for continued polymerization, thereby incorporating the second monomer as a distinct block into the linear polymer. The block copolymer so grown is living until terminated.

Termination converts the living end of the block copolymer into a non-propagating species, thereby rendering the polymer non-reactive toward monomer or coupling agent. A polymer so terminated is commonly referred to as a diblock copolymer. If the polymer is not terminated the living block copolymers can be reacted with additional monomer to form a sequential linear tri-block copolymer. Alternatively the living block copolymer can be contacted with multifunctional agents commonly referred to as coupling agents. Coupling two of the living ends together results in a linear triblock copolymer having twice the molecular weight of the starting, living, diblock copolymer. Coupling more than two of the living diblock copolymer regions results in a radial block copolymer architecture having at least three arms.

One of the first patents on linear ABA block copolymers made with styrene and butadiene is U.S. Pat. No. 3,149,182. Various block copolymers and processes for making them have been proposed over the years. Of particular interest are polymers of relatively high styrene content, which are useful for packaging and containers. Examples of such block copolymers, as well as the methods of preparing such block copolymers, include but are not limited to, polymers and methods disclosed in U.S. Pat. No. 4,925,899, U.S. Pat. No. 6,521,712, U.S. Pat. No. 6,420,486, U.S. Pat. No. 3,369,160, U.S. Pat. No. 6,265,485, U.S. Pat. No. 6,197,889, U.S. Pat. No. 6,096,828, U.S. Pat. No. 5,705,569, U.S. Pat. No. 6,031,053, U.S. Pat. No. 5,910,546, U.S. Pat. No. 5,545,690, U.S. Pat. No. 5,436,298, U.S. Pat. No. 4,248,981, U.S. Pat. No. 4,167,545, U.S. Pat. No. 4,122,134, U.S. Pat. No. 6,593,430, and U.S. Pat. No. 7,169,848.

While block copolymers are often used in compounded form, the presence of certain of the typical blending components can also have a detrimental impact on properties. Common blending components include plasticizing oils, tackifying resins, polymers, oligomers, fillers, reinforcements and additives of all varieties. Oils are often added to such block copolymers to increase softness and improve processability to the compound. However, such oils also typically reduce the strength and tear resistance of the compounds. What is needed now are new compounding materials that do not have such a dramatic negative effect on properties, while still imparting increased softness with improved processability.

Applicants have now discovered that, when certain low molecular weight anionic diene/vinyl aromatic oligomers or polymers are combined in a particular way with the styrenic block copolymers noted above, it is possible to obtain compounds having better strength and tear resistance than the analogous oiled compounds, and also experience significant improvements in manufacturing steps and economies as well as improved properties such as increased softness without a significant reduction in processability. In addition, such compositions have lower volatility at equivalent hardness, resulting in improved organoleptics, reduced fogging and reduced extractables.

SUMMARY OF THE INVENTION

The particular compositions of the present invention are "in-situ compositions", since the low molecular weight tailored softening modifier (which improves flow and softness) is made and/or finished "in-situ", along with the block copolymer. This "in-situ" recovery is essential since recovery of the tailored modifier as a neat material from the solvent in which it is manufactured is very difficult and problematic. At room temperature, softening modifiers have physical properties that are intermediate between free flowing solids and pourable liquids. They are difficult to handle as neat materials. For this reason, it is desirable to recover (finish) them from the manufacturing solvent as a blend with the base block copolymer that they have been designed to modify. The blend can thus be recovered as an easy to handle solid.

The tailored softening modifier/base polymer blend may be prepared before recovery from the manufacturing solvent by 1) combining separate process streams containing the individual components—modifier and base block copolymer or 2) preparing them in the same process stream. The two approaches have different advantages. When the two components are polymerized separately and the solvent blend is prepared by mixing prior to finishing, there are few constraints on the chemistry that may be used to make the softening modifier or the base polymer. The manufacturing chemistry and associated technologies can be rather simple and robust. The softening modifier might be prepared by a conventional anionic polymerization technique-1) initiation using a metal alkyl such as a lithium alkyl, 2) propagation by addition of the appropriate monomer(s), and 3) termination of the living chain end by addition of a stoichiometric amount of a protic reagent such as an alcohol. Alternatively, a polymerization chain transfer agent, such as a secondary amine, might be used to allow the preparation of more than one tailored softening modifier molecule per molecule of polymerization initiator. In this embodiment, the base block copolymer is prepared in a separate process step and can be made using any of the known processes for the synthesis of a block copolymer. Another approach may be to take the block copolymer and redissolve it in an appropriate solvent, and then combine it with a solution of the tailored softening modifier, and finish the two together.

Accordingly, the present invention broadly comprises a novel block copolymer composition comprising:

(a) 100 parts by weight of a solid block copolymer wherein:

(i) said block copolymer comprises at least two A blocks and at least one B block, each A block independently selected from mono alkenyl arene polymer blocks and each B block independently selected from (1) polymer blocks having at least one conjugated diene and at least one mono alkenyl arene and having a random distribution;
(2) polymer blocks having at least one conjugated diene and at least one mono alkenyl arene and having a blocked distribution;
(3) polymer blocks having at least one conjugated diene and at least one mono alkenyl arene and having a tapered distribution; and
(4) polymer blocks having at least one conjugated diene and at least one mono alkenyl arene and having a controlled distribution.
(ii) each A block having a peak number average molecular weight between about 3,000 and about 60,000 and each B block having a peak number average molecular weight ($MW_1$) between about 20,000 and about 300,000;
(iii) the total amount of mono alkenyl arene in the block copolymer is about 30 percent weight to about 80 percent weight; and
(iv) the weight percent of mono alkenyl arene in each B block ($S_1$) is between about 5 percent and about 75 percent; and (b) 5 to 250 parts by weight of a tailored softening modifier which is structurally related to the character of the B block of said block copolymer wherein:
(i) the ratio ($MW_2$)/($MW_1$) of the peak number average molecular weight of said softening modifier ($MW_2$) to the peak number average molecular weight of said B block of said block copolymer ($MW_1$) is 0.01 to 1.0, with a minimum molecular weight ($MW_2$) of 2,000;
(ii) the weight percent of mono alkenyl arene in each softening modifier ($S_2$) is between about 5 percent and about 75 percent and the ratio of $S_2/S_1$ is between 0.5 and 1.5; and (c) wherein said block copolymer is polymerized in solution in the presence of a solvent in a first reactor to form a first solution and said softening modifier is polymerized in solution in the presence of a solvent in a second reactor to form a second solution;
(d) said first and second solutions are combined to form a common solution; and
(e) the solvent is removed from the common solution, providing an intimate mixture of said block copolymer and said tailored softening modifier.

These particular compositions are termed "in-situ compositions", since the low molecular weight tailored modifier (which acts to improve flow and softness) is made or finished "in-situ", along with the controlled distribution block copolymer. When the tailored softening modifier is made originally in a separate reactor and in a separate solution, there are a number of means to combine the solutions and obtain the particular in-situ composition. These include:
1. combining the first solution and second solution after polymerization of both components and then finishing the solvent blend;
2. adding the second solution to the first solution prior to polymerization of the block copolymer, and then continuing with polymerization and finishing;
3. adding the second solution to the first solution during the polymerization of the block copolymer, followed by finishing; or
4. redissolving a solid block copolymer in a solvent to form a first solution, polymerizing the tailored softening modifier in a second solution, combining the first and second solutions, and then finishing the solvent blend.

Alternatively, it is possible to make the particular composition in a single reactor. In this case, the composition comprises:
(a) 100 parts by weight of a solid block copolymer wherein:
(i) said block copolymer comprises at least two A blocks and at least one B block, each A block independently selected from mono alkenyl arene polymer blocks and each B block independently selected from
1. polymer blocks having at least one conjugated diene and at least one mono alkenyl arene and having a random distribution;
2. polymer blocks having at least one conjugated diene and at least one mono alkenyl arene and having a blocked distribution;
3. polymer blocks having at least one conjugated diene and at least one mono alkenyl arene and having a tapered distribution; and
4. polymer blocks having at least one conjugated diene and at least one mono alkenyl arene and having a controlled distribution.
(ii) each A block having a peak molecular weight between about 3,000 and about 60,000 and each B block having a peak molecular weight ($MW_1$) between about 20,000 and about 300,000;
(iii) the total amount of mono alkenyl arene in the block copolymer is about 30 percent weight to about 80 percent weight; and
(iv) the weight percent of mono alkenyl arene in each B block ($S_1$) is between about 5 percent and about 75 percent; and (b) 5 to 250 parts by weight of a tailored softening modifier which is structurally related to the character of the B block of said block copolymer wherein:
(i) the ratio ($MW_2$)/($MW_1$) of the peak molecular weight of said softening modifier ($MW_2$) to the peak molecular weight of said B block of said block copolymer ($MW_1$) is 0.01 to 1.0, with a minimum molecular weight ($MW_2$) of 2,000;
(ii) the weight percent of mono alkenyl arene in each softening modifier ($S_2$) is between about 5 percent and about 75 percent and the ratio of $S_2/S_1$ is between 0.5 and 1.5; and (c) wherein said controlled distribution block copolymer is formed in solution in a reactor in the presence of a solvent to form a solution and said tailored softening modifier is formed in the same solution in the same reactor; and
(d) the solvent is removed from the solution, providing an intimate mixture of said controlled distribution block copolymer and said tailored softening modifier.

In this case, where a single reactor is employed, the alternatives include varying the order of polymerization, wherein:
1. the softening agent is polymerized prior to the block copolymer;
2. the softening agent is polymerized during the polymerization of the block copolymer; and
3. the softening agent is polymerized after the block copolymer.

As shown in the examples that follow, compositions of the present invention will have lower hardness in conjunction with improved strength, improved color, and lower tendency for oil bleed out as compared to traditional oils. In addition, it will be possible to obtain compositions and articles with improved gas permeability. Still further it will be possible to obtain compositions having lower volatility at equivalent hardness, along with improved organoleptics, improved fogging/smoking characteristics and lowered extractable levels.

Of primary interest, it will be possible to obtain significant and unexpected process advantages by practice of the present invention. Details regarding the particular unsaturated controlled distribution block copolymers and tailored softening modifiers, along with the processes for making them are described further below.

BRIEF DESCRIPTION OF THE DRAWING

FIG. 1 illustrates the dynamic mechanical spectra for Formulation 5.7 as explained in Example #6.

DETAILED DESCRIPTION OF THE INVENTION

The present invention offers novel compositions and methods of preparing such compositions. The two basic components in the novel compositions are (a) an unsaturated controlled distribution block copolymer, and (b) a novel tailored softening modifier.

1. Unsaturated Controlled Distribution Block Copolymers

The block copolymers utilized in the present invention broadly comprise any unsaturated block copolymers that meet the following criteria:
(1) the block copolymer has a monoalkenyl arene content equal to or greater than 30 weight percent, based on the total weight of the block copolymer; and
(2) the block copolymer has at least two A blocks and at least one B block wherein each A block is a monoalkenyl arene polymer block and wherein each B block is selected from:
  (a) polymer blocks having at least one conjugated diene and at least one mono alkenyl arene and having a random distribution;
  (b) polymer blocks having at least one conjugated diene and at least one mono alkenyl arene and having a blocked distribution;
  (c) polymer blocks having at least one conjugated diene and at least one mono alkenyl arene and having a tapered distribution; and
  (d) polymer blocks having at least one conjugated diene and at least one mono alkenyl arene and having a controlled distribution.

One important aspect of the block copolymers used in preparing the compositions of the present invention is the monoalkenyl arene content. As noted hereinbefore, the monoalkenyl arene content should be equal to or greater than 30 weight percent, based on the total weight of the block copolymer. Preferably the monoalkenyl arene content will range from about 40 to about 85 weight percent for the block copolymer. In alternative embodiments, the monoalkenyl arene content will range from about 50 to about 80 weight percent.

The monoalkenyl arenes utilized in the A and B blocks of the block copolymers are independently selected from styrene, alpha-methylstyrene, para-methylstyrene, vinyl toluene, vinylnaphthalene, and para-butyl styrene or mixtures thereof. Of these, styrene is the most preferred.

The conjugated dienes of the B blocks are independently selected from 1,3-butadiene and substituted butadienes, such as, for example, isoprene, piperylene, 2,3-dimethyl-1,3-butadiene, and 1-phenyl-1,3-butadiene, or mixtures thereof. Of these, isoprene and 1,3-butadiene are the most preferred with 1,3-butadiene being the more preferred of the two.

While a wide range of molecular weights of the block copolymers utilized in the present invention can be used, in many instances the number average molecular weight of each A block will independently range from about 3,000 to about 60,000, preferably from about 5,000 to about 45,000, and the number average molecular weight of each B block will independently range from about 20,000 to about 200,000, preferably from about 20,000 to about 150,000, when the block copolymers is a sequential block copolymer and from about 10,000 to about 100,000, preferable from about 10,000 to about 75,000, when the block copolymers is a coupled block copolymer.

As noted above, the B block(s) of the block copolymers that can be utilized in the present invention are selected from a variety of midblocks. More specifically, within the scope of the contemplated block copolymers are those block copolymers wherein the midblocks are considered to have a distribution configuration that is "random", "blocked", "tapered" or "controlled".

More specifically, in embodiment (a), B comprises a polymer block of at least one conjugated diene and at least one monoalkenyl arene wherein the B block has a random distribution. As used herein, the phrase "random distribution" means that the distribution of monomers from one end of the block to the other end is roughly uniform (e.g., it is a statistical distribution based on the relative concentrations of the monomers). Preferably, in this embodiment, the conjugated diene of each B block is independently selected from isoprene and butadiene, with butadiene being the most preferred, and the monoalkenyl arene is as defined hereinbefore with regard to A, with styrene be the most preferred.

In the second embodiment (b), B comprises a polymer block comprising at least one conjugated diene and at least one mono alkenyl arene, wherein the B block has a blocked distribution. As used herein, the phrase "blocked distribution" means that the distribution is a nonuniform distribution in which the A monomers (or in the alternative the B monomers) are more likely to be grouped with other A monomers (or in the case of the B monomers, with other B monomers) than is found in a statistical (i.e., "random") distribution thereby resulting in a short "defined" monomer block. Preferably, in this embodiment, the conjugated diene of each B block is also independently selected from isoprene and butadiene with butadiene being the most preferred and the monoalkenyl arene is as defined hereinbefore with regard to A, with styrene being the most preferred.

In the third embodiment (c), B comprises a polymer block comprising at least one conjugated diene and at least one mono alkenyl arene, wherein the B block has a tapered distribution. As used herein, the phrase "tapered distribution" means that the distribution is a nonuniform distribution in which the concentration of A monomer (or in the alternative, B monomer) at one end of the block is greater than at the other end of the block (it gradually declines from one end of the block to the other end of the block). As in the other embodiments, the conjugated diene of each B block is also independently, selected from isoprene and butadiene with butadiene being the most preferred and the monoalkenyl arene is as defined hereinbefore with regard to A, with styrene being the most preferred.

In the fourth and final embodiment (d), B comprises a polymer block comprising at least one conjugated diene and at least one mono alkenyl arene, wherein the B block has a controlled distribution. For purposes herein, the phrase "controlled distribution" is as defined in co-pending and commonly assigned U.S. patent application Ser. No. 10/359,981, filed Feb. 6, 2003, now U.S. Pat. No. 7,169,848, and entitled "NOVEL BLOCK COPOLYMERS AND METHOD FOR MAKING SAME". The entire contents of the Ser. No. 10/359,981 patent application, now U.S. Pat. No. 7,169,848, are thus incorporated herein by reference. More specifically, the molecular structure of the controlled distribution block copolymer has the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low mono alkenyl arene, e.g., styrene, blockiness. For the purposes hereof, "rich in" is defined as greater than the average amount, preferably 5% greater than the average amount. As in the other embodiments, the conjugated diene of each B block is also independently selected from isoprene and butadiene with butadiene being the most preferred and the monoalkenyl arene is as defined hereinbefore with regard to A, with styrene being the most preferred.

The block copolymers of the present invention may be prepared by any of the methods known in the art, including sequential polymerization and coupling using standard coupling agents. Examples of block copolymers that may be used in the films of the present invention, as well as the methods of preparing such block copolymers, include but are not limited to, polymers and methods disclosed in U.S. Pat. No. 4,925,899, U.S. Pat. No. 6,521,712, U.S. Pat. No. 6,420,486, U.S. Pat. No. 3,369,160, U.S. Pat. No. 6,265,485, U.S. Pat. No. 6,197,889, U.S. Pat. No. 6,096,828, U.S. Pat. No. 5,705,569, U.S. Pat. No. 6,031,053, U.S. Pat. No. 5,910,546, U.S. Pat. No. 5,545,690, U.S. Pat. No. 5,436,298, U.S. Pat. No. 4,248,981, U.S. Pat. No. 4,167,545, U.S. Pat. No. 4,122,134, U.S. Pat. No. 6,593,430, and U.S. patent application Ser. No. 10/359,981, now U.S. Pat. No. 7,169,848, each incorporated herein by reference.

As noted hereinbefore, the block copolymers used in the present invention have at least two A blocks and at least one B block. Accordingly, the block copolymers used in the present invention may comprise any block copolymer which meets the criteria for the present invention, including block copolymers that are linear sequential, as well as block copolymers that are coupled (including linear coupled and branched coupled block copolymers). When the block copolymer is linear coupled or branched coupled, the arms may be symmetrical or asymmetrical.

While not wishing to be bound by the structure of the present block copolymers, representative structures which contain at least two A blocks and at least one B block and which are considered to be within the scope of the present invention, provided they meet the other criteria noted above, include, but are not limited to block copolymers of the structure:

(1) $(A-A_1-B-C)m-X-(C-B-A_1)n$ or $(A-B-C)n-X$, wherein each A block is independently a polymer block of a monoalkenyl arene and each $A_1$ block is independently a polymer block of a monoalkenyl arene, each B is independently a copolymer block of monoalkenyl arene and conjugated diene, each C is independently a block of conjugated diene and $m \leq n$ and m+n is 3 to 20. A blocks of the same block copolymer may have different molecular weights.

(2) $A_1-B_1-B_2-A_2$, wherein each $A_1$ and $A_2$ is independently a polymer block of monoalkenyl arene and the each of the B's is independently a polymer block of monoalkenyl arene and conjugated diene.

(3) A-B-A, (A-B)n, $(A-B)_n$-A, (A-B-A)n-X, or (A-B)n-X, wherein each A is independently a polymer block of monoalkenyl arene, each B is independently a polymer block of monoalkenyl arene and conjugated diene, X is the residue of a coupling agent and n is from 2 to 30.

(4) $A-A_1-B-B_1-X-B_1-B-A_1-A$, $A-B-B_1-X-B-A$, $A-A_1-B-B_1-X-B_1-B-A$, wherein each A and $A_1$ is independently a polymer block of monoalkenyl arene and each B and $B_1$ is independently a polymer block of monoalkenyl arene and conjugated diene (5) B-(A-B)n; X-[(A-B)n]m+1; X—[(B-A)n]m+1; X-[(A-B)n-A]m+1; X—[(B-A)n-B)]m+1; Y-[(A-B)n]m+1; Y—[(B-A)n]m+1; Y-[(A-B)n-A]m+1; Y—[(B-A)n-B]m+1 wherein each A is independently a polymer block of monoalkenyl arene, each B is independently a polymer block of monoalkenyl arene and diene, X is a radical of an n-functional initiator, Y is a radical of an m-functional coupling agent and m and n are natural numbers from 1 to 10.

(6) $(A_1-A_2-B_1-B_2-B_3)n-X-(B_3-B_2-B_1-A_2)m$ wherein each $A_1$ and $A_2$ is independently a polymer block of monoalkenyl arene, each $B_1$, $B_2$ and $B_3$ is independently a polymer block of monoalkenyl arene and conjugated diene and n and m are each independently 0 or $\geq 3$.

(7) $A-A_1-B-X-B-A_1-A$, $A-B-X-B-A$, $A-A_1-B-X-B-A$ wherein each A is independently a polymer block of monoalkenyl arene and each B is independently a polymer block of monoalkenyl arene and conjugated diene.

(8) $A_1-B_1-C_1$, $A_1-C_1-B_1$, $A_1-B_1-C_1-A_2$, $A_1-B_1-C_1-B_2-A_2$, $A_1-C_1-B_1-C_2-A_2$, $A_1-B_1-B_2-C_1-A_2$, $A_1-B_1-C_1-B_2-C_2-B_3-A_2$, $A_1-B_1-A_2-B_2-C_1-A_3$, $A_1-B_1-C_1-A_2-C_2-B_2-A_3$, $A_1-B_1-A_2-C_1-B_2$, $A-B_1-A_2-B_2-C_1$, wherein each $A_1$, $A_2$ and $A_3$ is independently a monoalkenyl arene, each $B_1$ and $B_2$ is independently a polymer block of monoalkenyl arene and conjugated diene and each $C_1$ and $C_2$ is independently a polymer block of conjugated diene.

As used herein, in those instances where it is noted that the blocks are "independently" a polymer block, such polymer blocks can be the same, or they can be different.

It should be noted that the above-described unhydrogenated block copolymers used to prepare articles of the present invention may, if desired, be readily prepared by the methods set forth above. However, since many of these copolymers are commercially available, it is usually preferred to employ the commercially available polymer as this serves to reduce the number of processing steps involved in the overall process. Examples of the above block copolymers which are commercially available include, but are not limited to, Styrolux® Polymers (commercially available from BASF Aktiengesellschaft), K-Resin® Polymers (commercially available from Chevron-Phillips Corporation) and KRATON® Polymers (commercially available from KRATON Polymers LLC).

2. Tailored Softening Modifier

The Tailored Softening Modifier (TSM) used in the present invention will preferably have a structure similar to that of the B block of the block copolymer. For example, if the B block is a random copolymer of styrene and butadiene, the TSM used with that block copolymer will be a random copolymer of styrene and butadiene; if the B block is a tapered copolymer of styrene and butadiene, the TSM used with that block copolymer will be a tapered copolymer; if the B block is a controlled distribution copolymer of styrene and butadiene, the TSM used with that block copolymer will also be controlled distribution, etc. While not the preferred embodiment, it is possible to combine a TSM with dissimilar structure to that of the B block of the block copolymer (e.g., random B block and controlled distribution TSM).

Additionally, the TSM will meet the following requirements:
  i. the ratio $(MW_2)/(MW_1)$ of the peak molecular weight of said softening modifier $(MW_2)$ to the peak molecular weight of said B block of said block copolymer $(MW_1)$ is 0.01 to 1.0, with a minimum molecular weight $(MW_2)$ of 2,000;
  ii. the weight percent of mono alkenyl arene in each softening modifier $(S_2)$ is between about 5 percent and about 75 percent and the ratio of $S_2/S_1$ is between 0.5 and 1.5; and When the block copolymer is a controlled distribution block copolymer, the TSM will also have a controlled distribution structure. For example, the tailored softening modifier used with the controlled distribution block copolymer will be structurally related to the character of the B block of the controlled distribution block copolymer wherein:
  i. the softening modifier contains at least one conjugated diene and at least one mono alkenyl arene having a blockiness index $I_2$, such that the ratio of $I_2/I_1$ is between 0.2 and 2.0;
  ii. the ratio $(MW_2)/(MW_1)$ of the peak molecular weight of said softening modifier $(MW_2)$ to the peak molecular weight of said B block of said controlled distribution block copolymer $(MW_1)$ is 0.01 to 1.0, with a minimum molecular weight $(MW_2)$ of 2,000 g/mol; and
  iii. the weight percent of mono alkenyl arene in each softening modifier $(S_2)$ is between about 5 percent and about 75 percent and the ratio of $S_2/S_1$ is between 0.5 and 1.5

The following are preferred ranges for the properties of the Tailored Softening Modifier used with controlled distribution block copolymers:

The monoalkenyl arene is preferably styrene and the conjugated diene is preferably 1,3-butadiene, isoprene or mixtures thereof, more preferably 1,3-butadiene;
The blockiness index $(I_2)$ of the modifier is preferably 0 to 80 percent, more preferably 0 to 35 percent
The ratio of $I_2/I_1$ is preferably between 0.5 and 1.5, and more preferably between 0.75 and 1.25;
the ratio $(MW_2)/(MW_1)$ of the peak molecular weight of said softening modifier $(MW_2)$ to the peak molecular weight of said B block of said controlled distribution block copolymer $(MW_1)$ is 0.02 to 1.0, preferably 0.05 to 0.8, with a minimum molecular weight $(MW_2)$ of 2,000 g/mol; and
the weight percent of mono alkenyl arene in each softening modifier $(S_2)$ is preferably between about 20 percent and about 50 percent and the ratio of $S_2/S_1$ is preferably between 0.75 and 1.25.

3. Overall Process to Make Block Copolymer and Tailored Softening Modifier

Anionic, solution co-polymerization to form the block copolymers and tailored softening modifiers of the present invention can be carried out using, to a great extent, known and previously employed methods and materials. In general, the co-polymerization is attained anionically, using known selections of adjunct materials, including polymerization initiators, solvents, promoters, and structure modifiers.

An important aspect of the present invention is to control the microstructure or vinyl content of the conjugated diene in the controlled distribution copolymer block B and in the softening modifier. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of butadiene as the conjugated diene, it is preferred that about 20 to about 80 mol percent of the condensed butadiene units in the copolymer block have 1,2 vinyl configuration as determined by proton NMR analysis.

The solvent used as the polymerization vehicle may be any hydrocarbon that does not react with the living anionic chain end of the forming polymer, is easily handled in commercial polymerization units, and offers the appropriate solubility characteristics for the product polymer. For example, non-polar aliphatic hydrocarbons, which are generally lacking in ionizable hydrogens make particularly suitable solvents. Frequently used are cyclic alkanes, such as cyclopentane, cyclohexane, cycloheptane, and cyclooctane, all of which are relatively non-polar. Other suitable solvents will be known to one skilled in the art and can be selected to perform effectively in a given set of process conditions, with temperature being one of the major factors taken into consideration.

Starting materials for preparing the block copolymers and softening modifiers of the present invention include the initial monomers. The alkenyl arene can be selected from styrene, alpha-methylstyrene, para-methylstyrene, vinyl toluene, vinylnaphthalene, and para-butyl styrene or mixtures thereof. Of these, styrene is most preferred and is commercially available, and relatively inexpensive, from a variety of manufacturers.

The conjugated dienes for use herein are 1,3-butadiene and substituted butadienes such as isoprene, piperylene, 2,3-dimethyl-1,3-butadiene, and 1-phenyl-1,3-butadiene, or mixtures thereof. Of these, 1,3-butadiene is most preferred. As used herein, and in the claims, "butadiene" refers specifically to "1,3-butadiene".

Other important starting materials for anionic co-polymerizations include one or more polymerization initiators. In the present invention such include, for example, alkyl lithium compounds and other organolithium compounds such as s-butyllithium, n-butyllithium, t-butyllithium, amyllithium and the like, including di-initiators such as the di-sec-butyl lithium adduct of m-diisopropenyl benzene. Other such di-initiators are disclosed in U.S. Pat. No. 6,492,469. Of the various polymerization initiators, s-butyllithium is preferred. The initiator can be used in the polymerization mixture (including monomers and solvent) in an amount calculated on the basis of one initiator molecule per desired polymer chain. The lithium initiator process is well known and is described in, for example, U.S. Pat. Nos. 4,039,593 and Re. 27,145, which descriptions are incorporated herein by reference.

Polymerization conditions to prepare the novel copolymers of the present invention are typically similar to those used for anionic polymerizations in general. In the present invention polymerization is preferably carried out at a temperature of from about −30° to about 150° C., more preferably about 10° to about 100° C., and most preferably, in view of industrial limitations, about 30° to about 90° C. It is carried out in an inert atmosphere preferably nitrogen, and may also be accomplished under pressure within the range of from about 0.5 to about 10 bars. This copolymerization generally requires less than about 12 hours, and can be accomplished in from about 5 minutes to about 5 hours, depending upon the temperature, the concentration of the monomer components, the molecular weight of the polymer and the amount of distribution agent that is employed.

As used herein, "thermoplastic block copolymer" is defined as a block copolymer having at least a first block of one or more mono alkenyl arenes, such as styrene and a second block of a controlled distribution copolymer of diene and mono alkenyl arene. The method to prepare this thermoplastic block copolymer is via any of the methods generally known for block polymerizations. The present invention includes as an embodiment a thermoplastic copolymer composition, which may be a di-block, tri-block copolymer, tetra-block copolymer or multi-block composition. In the case of the di-block copolymer composition, one block is the alkenyl arene-based homopolymer block and polymerized therewith is a second block of a controlled distribution copolymer of diene and alkenyl arene. In the case of the tri-block composition, it comprises, as end-blocks the glassy alkenyl arene-based homopolymer and as a mid-block the controlled distribution copolymer of diene and alkenyl arene. Where a tri-block copolymer composition is prepared, the controlled distribution diene/alkenyl arene copolymer can be herein designated as "B" and the alkenyl arene-based homopolymer designated as "A". The A-B-A, tri-block compositions can be made by either sequential polymerization or coupling. In the sequential solution polymerization technique, the mono alkenyl arene is first introduced to produce the relatively hard aromatic block, followed by introduction of the controlled distribution diene/alkenyl arene mixture to form the mid block, and then followed by introduction of the mono alkenyl arene to form the terminal block. In addition to the linear, A-B-A configuration, the blocks can be structured to form a radial (branched) polymer, $(A-B)_n X$, or both types of structures can be combined in a mixture. In addition it is contemplated that asymmetrical, polymodal block copolymers are included, where some of the A blocks have higher molecular weights than some of the other A blocks—e.g., such a polymer could have the structure $(A_1-B)_d$—X—$_e (B-A_2)$ where d is 1 to 30 and e is 1 to 30, and the molecular weight of A1 and A2 blocks differ by at least 20 percent. Some A-B diblock polymer can be present but preferably at least about 70 weight percent of the block copolymer is A-B-A or radial (or otherwise branched so as to have 2 or more terminal resinous blocks per molecule) so as to impart strength.

Preparation of Radial (Branched) Polymers Requires a Post-Polymerization Step called "coupling". It is possible to have either a branched controlled distribution block copolymer and/or a branched tailored softening modifier. In the above radial formula for the controlled distribution block copolymer, n is an integer of from 2 to about 30, preferably from about 2 to about 15, and X is the remnant or residue of a coupling agent. A variety of coupling agents are known in the art and include, for example, dihalo alkanes, silicon halides, siloxanes, multifunctional epoxides, silica compounds, esters of monohydric alcohols with carboxylic acids, (e.g. dimethyl adipate) and epoxidized oils. Star-shaped polymers are prepared with polyalkenyl coupling agents as disclosed in, for example, U.S. Pat. Nos. 3,985,830; 4,391,949; and 4,444,953; Canadian Patent Number 716,645. Suitable polyalkenyl coupling agents include divinylbenzene, and preferably m-divinylbenzene. Preferred are tetra-alkoxysilanes such as tetra-ethoxysilane (TEOS), aliphatic diesters such as dimethyl adipate and diethyl adipate, and diglycidyl aromatic epoxy compounds such as diglycidyl ethers deriving from the reaction of bis-phenol A and epichlorohydrin.

4. Separate Reactor Process to Make Components

One alternative to prepare the in-situ compositions of the present invention is to polymerize the tailored softening modifier separately from the block copolymer in a separate reactor. The following alternatives are thus possible:

a) Addition of the Tailored Softening Modifier Solution Before or During the Preparation of the Block Copolymer.

Optionally, the solution of tailored softening modifier in its polymerization solvent could be used as the solvent for the synthesis of the controlled distribution block copolymer. Because the tailored modifier may be low in molecular weight (relative to the entanglement molecular weight for polymer), it is possible to select conditions such that it will contribute little to the solution viscosity of the blend. Solution viscosity is often the limiting factor affecting the amount of block copolymer that can be prepared in a batch polymerization process. In this scheme, the tailored softening modifier is in essence replacing some of the solvent that would have been used had block copolymer been made in the usual way. When the solution of the blend is finished, more product, base block copolymer plus modifier, will be generated per pound of solution than would have been realized had the base block copolymer been prepared in the normal way. The efficiency of the polymerization process has been enhanced.

b) Addition of Tailored Softening Modifier Solution after the Preparation of the Base Block Copolymer.

The block copolymer might be prepared before the addition of the solution of the tailored softening modifier and the two streams could be blended prior to other polymer treatment steps, or wash or addition of antioxidants. Such a process would benefit from not having to apply these post-polymerization techniques to two separate streams.

c) Addition of Tailored Softening Modifier Solution Just Prior to Finishing.

Even if the solutions of the controlled distribution block copolymer and the tailored softening modifier are only combined immediately before the solvent removal step, this process benefits from the ease of being able to prepare the two components by the methods that are best suited to each of them. The two polymerization processes are not constrained to only those processing conditions that are compatible with both preparations. A robust process is envisioned. Also, a more energy efficient removal process may be realized since the blend would be at a higher solids content than the initial block copolymer solution itself.

d) Addition of Tailored Softening Modifier Solution to a Solution of Redissolved Block Copolymer, and then Finishing In this example, a solid block copolymer is redissolved in an appropriate solvent, and is then combined with the solution of the tailored softening modifier prior to finishing both materials together.

5. Single Reactor Process to Make Components

On the other hand, preparation of the tailored softening modifier and the block copolymer in the same reactor obviates the need for a second polymerization vessel and the associated process control equipment. In this approach, equipment costs could be substantially reduced. Not wishing to be limited to the process concepts described below, the following examples are offered as illustrations of how this approach could be practiced.

a) Preparation of the Tailored Softening Modifier Prior to the Preparation of the Block Copolymer.

This approach is essentially the same as outlined above for the case where the tailored softening modifier solution is used to replace part of the solvent for the preparation of the block copolymer. All of the efficiencies of that process would be realized with the added benefit that only one vessel would be used in the present example.

b) Preparation of the Tailored Softening Modifier During the Preparation of the B Block, where the B Block of the Block Copolymer is Synthesized First.

In this approach, sufficient initiator would be added to start the polymerization of both the tailored modifier and the block copolymer at the same time. When sufficient monomer had been polymerized (as controlled by programmed addition of the monomer or controlled by time of termination under a kinetically regulated scheme) to make tailored modifier of the desired molecular weight, the living chain ends for the tailored modifier portion of the mixture are terminated by addition of the appropriate amount of a protic moiety such as an alcohol. The remaining living chains being those of the incipient base block copolymer are allowed to continue polymerization to the completion of the first block of the copolymer. Addition of the second monomer(s), at that point, would allow the construction of a block copolymer using conventional techniques for the synthesis of such polymers (to include sequential addition of monomer methods, coupling chemistries, and various post polymerization techniques). This approach has all of the advantages of the first described method in this section, with the added bonus that one polymerization step has been eliminated so that a faster polymerization cycle time may be realized.

c) Preparation of the Tailored Softening Modifier During the Preparation of the B Block of the Block Copolymer, where the B Block is Synthesized Last.

The converse of the above process is to make the tailored softening modifier during the last polymerization step for the controlled distribution block copolymer. In this process, a second charge of the initiator species is added at an appropriate point in the last step of the polymerization of the controlled distribution block copolymer to allow "re-initiation" of polymerization and sufficient propagation of the freshly initiated species to generate the tailored softening modifier of the desired molecular weight. The fresh batch of initiator could be charged to an on going polymerization at the right time to make the right molecule. Alternatively, a fresh charge of monomer could be added after the addition of the new initiator aliquot to allow polymerization of the tailored softening modifier and the completion of the polymerization of the block copolymer. The solvent blend of the block copolymer and the tailored modifier would then be terminated by the addition of an acid species. The resulting mixture could then be recovered from the solvent using the methods normally used to recover the block copolymer. As described above, this approach could result in a faster polymerization cycle time as the tailored modifier is being prepared concurrently with the base block copolymer.

d) Preparation of the Tailored Softening Modifier after the Preparation of the Last Segment of the Controlled Distribution Block Copolymer.

In this approach, the synthesis of the block copolymer is completed and the living chain ends of the base block copolymer are terminated optionally by coupling, protonation, reaction with a capping agent, or chain transfer to an initiating species. At this point in the preparation, polymerization is reinitiated by addition of a suitable amount of initiating agent (could be in part or in total an activated chain transfer species). Sufficient monomer is added to complete the polymerization of the tailored modifier whereupon a terminating agent is added to complete the polymerization process. This approach has advantages similar to those outlined in the first example above, with the caveat that the preparation of the block copolymer may be more straightforward (not contaminated with terminating agents and things of that sort). The blend of the tailored modifier and the block copolymer could then be recovered from the solvent using any of the methods that are standard for the recovery of the block copolymer.

6. Finishing Step

The last step, following all polymerization(s), is a finishing treatment to remove the final polymers from the solvent. Various means and methods are known to those skilled in the art, and include use of steam to evaporate the solvent, and coagulation of the polymer followed by filtration. The final result is a "clean" block copolymer composition useful for a wide variety of challenging applications, according to the properties thereof.

7. End-Uses and Applications

The polymer compositions of the present invention are useful in a wide variety of applications. The following is a partial list of the many potential end uses or applications: over molding, personal hygiene, molded and extruded goods, barrier films, packaging, closures such as synthetic corks and cap seals, tubing, containers including containers for food or beverages, interior automotive applications, window gaskets, foamed products, elastic film, fibers including bicomponent and monofilament, adhesives, cosmetics and medical goods.

Finally, the copolymer compositions of the present invention can be compounded with other components not adversely affecting the copolymer properties. Exemplary materials that could be used as additional components would include, without limitation, pigments, antioxidants, stabilizers, surfactants, waxes, flow promoters, traditional processing oils, solvents, particulates, tackifying resins, end block resins, and materials added to enhance processability and pellet handling of the composition. In addition, the copolymer compositions can be further formulated with other polymers, including by way of illustration and not limitation, polyolefins (e.g., propylene homopolymers and copolymers, ethylene homopolymers and copolymers and butylene homopolymers and copolymers), styrene polymers (e.g., polystyrene homopolymers, HIPS, ABS, SAN), engineering thermoplastics, polyurethanes, polyamides, polycarbonates, polyesters, functionalized polymers (e.g., maleated PP, maleated S-EB-S), styrene diene block copolymers (e.g. S—I—S, S—B—S, S—I/B—S), hydrogenated styrene diene block copolymers (e.g. S-EB-S, S-EP-S, S-EP, S-EB) and the like.

The following examples are intended to be illustrative only, and are not intended to be, nor should they be construed as being, limitative in any way of the scope of the present invention

EXAMPLE #1A

A series of tailored softening modifiers were prepared by anionic copolymerization of styrene and butadiene in the presence of diethyl ether, a distribution control agent and are summarized in Table #1.

TABLE #1

| TSM # | MW (g/mol) | Styrene Blockiness (%) | PSC (%) | 1,2 BD (%) |
|---|---|---|---|---|
| 1 | 16,500 | 29 | 41 | 8 |
| 2 | 38,000 | 11 | 37 | 17 |
| 3 | 11,300 | 23 | 51 | 9 |
| 4 | 4,200 | 11 | 48 | 10 |

A representative tailored softening modifier, TSM #1, was made under standard anionic copolymerization conditions by initiating the reaction of styrene (0.92 kg) and butadiene (0.93 kg) at 45° C. with s-butyllithium (289 ml of a 12% wt solution) in the presence of a distribution control agent, diethyl ether (9.8 kg), using cyclohexane (123 kg) as a solvent. Following the initiation of polymerization of batch charges of monomers, the remaining 6.43 kg of styrene and 11 kg of butadiene were charged at a rate of about 0.75 kg/min and 0.34 kg/min, respectively; the temperature was allowed to increase to about 60° C. When the polymerization was complete, the reaction was terminated with about 20 milliliters of methanol. The resulting unsaturated, tailored softening modifier had a molecular weight of 60.7 kg/mole, a vinyl content of 34.6% and a polystyrene content of 37.6% by $^1$H NMR. The styrene blockiness by $^1$H NMR was measured to be 11%, indicating that a substantial majority of the styrene was separated from other styrene units by at least one butadiene unit. The cement was then washed with deionized water and 19 grams Irganox 1010 (0.07% wt polymer basis) was added as a stabilizer. The solids content at this point was 13% weight.

EXAMPLE #1B

A tailored softening modifier, TSM #2, was prepared by anionic copolymerization of styrene and butadiene in cyclohexane, in the presence of about 50 PPM o-dimethoxybenzene (ODMB), under standard anionic copolymerization conditions, by initiating the reaction of styrene (0.243 kg) and butadiene (0.036 kg, added as a 50% wt solution in cyclohexane) at about 65° C. with s-butyllithium (38.6 ml of about 5% wt solution) in the presence of a distribution control agent, ODMB (0.2 grams), using cyclohexane (3.02 kg) as a solvent. Following the initiation of polymerization of batch charges of monomers, the remaining 0.647 kg of butadiene solution (0.323 kg butadiene) was charged at a rate of about 12 g/min; the temperature was allowed to increase to about 70° C. When the polymerization was complete, the reaction was terminated with about 0.8 milliliters of methanol, and neutralized by adding about 1 gram of water, followed by dropping the reactor pressure, and pressurizing to about 45 psig with carbon dioxide. The resulting unsaturated, tailored softening modifier had a molecular weight of 38 kg/mole, a vinyl content of 17% and a polystyrene content of 37% by $^1$H NMR. The styrene blockiness by $^1$H NMR was measured to be 11%, indicating that a majority of the styrene was separated from other styrene units by at least one butadiene unit. 0.6 grams Irganox 1010 (0.1% wt polymer basis) and 1.2 grams of Irgafos 168 (0.2% wt polymer basis) were added as stabilizers. The solids content at this point was 15% weight.

EXAMPLE #1C

A tailored softening modifier, TSM #3, was prepared by anionic copolymerization of styrene and butadiene in cyclohexane, under standard anionic copolymerization conditions, by initiating the reaction of styrene (255 grams) and butadiene (57 grams) at about 85° C. with s-butyllithium (about 57 grams of 1M solution) in cyclohexane (3.9 kg). Following the initiation of polymerization of batch charges of monomers, the remaining 193 grams of butadiene was charged at a rate of about 4.9 gram/min; the temperature was maintained at about 85° C. When the polymerization was complete, the reaction was terminated with about 23 grams of methanol. The resulting unsaturated, tailored softening modifier had a molecular weight of 11.3 kg/mole, a vinyl content of 9% and a polystyrene content of 51% by $^1$H NMR. The styrene blockiness by $^1$H NMR was measured to be 23%, indicating that a majority of the styrene was separated from other styrene units by at least one butadiene unit. The solids content at this point was 13% weight.

EXAMPLE #1D

A tailored softening modifier, TSM #4, was prepared by anionic copolymerization of styrene and butadiene in cyclohexane, under standard anionic copolymerization conditions, by initiating the reaction of styrene (260 grams) and butadiene (52 grams) at about 85° C. with s-butyllithium (about 59 grams of 1M solution) in cyclohexane (4.7 kg). Following the initiation of polymerization of batch charges of monomers, the remaining 197 grams of butadiene was charged at a rate of about 3.9 gram/min; the temperature was maintained at about 85° C. When the polymerization was complete, the reaction was terminated with about 18 grams of methanol. The resulting unsaturated, tailored softening modifier had a molecular weight of 4.2 kg/mole, a vinyl content of 10% and a polystyrene content of 48% by $^1$H NMR. The styrene blockiness by $^1$H NMR was measured to be 11%, indicating that a majority of the styrene was separated from other styrene units by at least one butadiene unit. The solids content at this point was 10% weight.

EXAMPLE #2—PREPARATION OF CDBC #1

Various controlled distribution block copolymers were synthesized for blending with tailored softening modifiers to illustrate the present invention. The rubber block of a controlled distribution block copolymer (CDBC #1) was prepared by anionic copolymerization of styrene and butadiene in cyclohexane, in the presence of about 20 PPM o-dimethoxybenzene (ODMB). In one reactor, styrene (24 kg) was polymerized at about 60° C. with s-butyllithium (1160 ml of a 12% wt solution) in cyclohexane (98 kg). GPC analysis of a sample collected at the end of this polymerization indicated a molecular weight of 14.5 kg/mole. 100.8 kg of this solution was then transferred to a second reactor containing 262 kg cyclohexane, 26 kg styrene, 3.8 kg butadiene and 8.6 grams ODMB at about 70° C. Following completion of the transfer, an additional 35 kg of butadiene was charged at a rate of about 0.58 kg/min; the temperature was maintained at about 70° C. About 10 minutes after the butadiene charge was complete, the color of the solution changed from pale yellow to orange, indicating that the butadiene had been fully consumed. The reaction was allowed to proceed for another few minutes, to insure all of the styrene had been consumed, and then about 0.5 kg of butadiene was added. The butadiene charge was allowed to react for several minutes, and then 129.5 grams of tetraethoxysilane (about 0.46 mole/mole polymer-Li) was added to couple the living chains. A sample collected prior to coupling had a molecular weight of 66.6 kg/mole, a vinyl content of 15% and an overall polystyrene content of 54% by $^1$H NMR. This polystyrene content is consistent with a polystyrene content of the controlled distribution segment of about 40%. The styrene blockiness by $^1$H NMR was measured to be 59%. Assuming all of the styrene in the first segments is blocky leads to the conclusion that about 28% of the styrene in the controlled distribution segment is blocky; the majority of the styrene in this segment is separated from other styrene units by at least one butadiene unit. GPC analysis of the final product indicates that about 91% of the chains coupled, and the majority of these (90%) coupled to form a linear product, with the remainder being primarily 3-arm (radial). About 5 milliliters of methanol was added to terminate any remaining chains, and then 170 grams Irganox 1010 (0.2% wt polymer basis) and 298 grams of Irgafos 168 (0.35% wt polymer basis) were added as stabilizers. The polymer was recovered by hot water coagulation. The controlled distribution block copolymers described in Table #2 are utilized in the examples that follow and were prepared using similar techniques. CDBC-1 and CDBC-2 have an (A-B)n-X structure while CDBC-3 is of the (A-B—C)n-X type.

TABLE #2

| CDBC # | Midblock MW $MW_1$ (g/mol) | Total Styrene Blockiness (%) | Total PSC (%) | Midblock PSC (%) | 1,2 BD (%) |
|---|---|---|---|---|---|
| 1 | 52,000 | 59 | 54 | 40 | 15 |
| 2 | 48,000 | 46 | 62 | 48 | 25 |
| 3 | 26,000 | 80 | 75 | 46 | 9 |

EXAMPLE #3—BLENDS OF TSM AND BLOCK COPOLYMER

Blends #1 and #2 of Tailored Softening Modifiers and Controlled Distribution Block Copolymers were prepared according to the following general procedure: The specified quantity of CDBC polymer and TSM were added to a Cowles high shear dissolver, along with a certain amount of cyclohexane, in order to form a solution containing about 14% weight solids. The resulting mixture was then heated to about 90° C., and allowed to mix at about 1400 RPM for 60 to 120 minutes. The solvent was then stripped in a cyclone and the blend recovered as crumb. Blends 3-5 were prepared by casting a film prepared from the specified quantity of CDBC polymer and TSM in cyclohexane. Blend 6 was also prepared by casting a film from cyclohexane, however Styroflex BX6105 is not a controlled distribution polymer. The resulting blends are shown below in Table #3, and are then used in the following examples:

TABLE #3

| Blend # | Block Copolymer | TSM # | TSM (w %) |
|---|---|---|---|
| 1 | CDBC #3 | 1 | 20 |
| 2 | CDBC #3 | 1 | 40 |
| 3 | CDBC #3 | 3 | 20 |
| 4 | CDBC #3 | 4 | 20 |
| 5 | CDBC #2 | 2 | 20 |
| 6 | Styroflex BX6105 | 2 | 20 |

The raw materials listed below were used in the ensuing examples:

D-1102—a linear SBS block copolymer with 28% styrene supplied by KRATON Polymers.

D-1164—a linear SIS block copolymer with 29% styrene supplied by KRATON Polymers.

D-1114—a linear SIS block copolymer with 19% styrene supplied by KRATON Polymers.

Kaydol—a paraffinic mineral oil supplied by Crompton.

Benzoflex 354—a benzoic acid diester supplied by Velsicol Chemical Corporation.

Drakeol 34—a paraffinic mineral oil supplied by Penreco.

Renoil 471—a naphthenic oil supplied by Renkert Oil.

Finester EH-25—an octanoate ester supplied by Finetex.

Emersol 7043—palmitic acid supplied by Cognis Corporation.

PVC 9600-70—a 70 Shore A flexible PVC supplied by Sylvin Technologies.

EXAMPLE #4

This example illustrates the effectiveness of tailored softening modifiers to soften CDBC #3 in an effort to mimic flexible PVC properties. Table #4 illustrates several approaches to soften CDBC #3 into a hardness range between 70 and 90 shore A using a variety of existing plasticizers ranging from paraffinic oil to ester oils. In addition to mimicking mechanical properties of flexible PVC it is also necessary for the formulation to be transparent and colorless with no oil bleed out. In many applications direct food contact FDA approval is also necessary. None of the approaches below meet all of these requirements. As such an alternate approach is desired. All samples in Tables #4 were prepared by compression molding. Blends were first mixed in a Brabender mixing head using practices known to one skilled in the art followed by compression molding.

TABLE #4

| | Formulation | | | | | | | |
|---|---|---|---|---|---|---|---|---|
| | 4.1 | 4.2 | 4.3 | 4.4 | 4.5 | 4.6 | 4.7 | 4.8 |
| CDBC #3 | 85 | 80 | 80 | 85 | 95 | 90 | 85 | 85 |
| D-1155 | | | | | | | | |
| Benzoflex 354 | 15 | | | | | | | |
| Drakeol 34 | | 20 | | | | | | |
| Renoil 471 | | | 20 | | 5 | 10 | 15 | |
| Finester EH-25 | | | | 15 | | | | |
| Emersol 7043 | | | | | | | | 15 |
| Hardness, A | 83 | n.m | 68 | 60 | 83 | 83 | 76 | 88 |
| Transparent | yes | no | yes | yes | yes | yes | yes | no |
| Oil Bleed | no | yes | yes | no | no/waxy | no | no | no |
| color | slight yellow | white | hazy white | none | none | none | yellow | white |

TABLE #4-continued

|  | Formulation | | | | | | | |
|---|---|---|---|---|---|---|---|---|
|  | 4.1 | 4.2 | 4.3 | 4.4 | 4.5 | 4.6 | 4.7 | 4.8 |
| FDA direct food contact | no | yes | no | no | no | no | no |  |
| Tensile Strength | 1350 | n.m. | n.m. | 420 | 3100 | n.m. | 2575 | n.m. |
| Elongation % | 435 | n.m. | n.m. | 400 | 500 | n.m. | 650 | n.m. |
| 300% Modulus | 990 | n.m. | n.m. | 340 | 1930 | n.m. | 1165 | n.m. |

Blends #3 and #4 combine CDBC #3 with tailored softening modifiers as an alternate approach to soften a rigid styrene rich block copolymer. As shown in Table #5, the use of tailored softening modifiers sufficiently reduces the hardness while maintaining transparency. Compression molded plaques were also colorless with no evidence of oil bleed out. In addition tensile properties were very similar to that of a 70 Shore A flexible PVC.

TABLE #5

|  | Formulation | | |
|---|---|---|---|
|  | 4.10 | 4.11 | 4.12 |
| Blend #3 | 100 |  |  |
| Blend #4 |  | 100 |  |
| PVC 9600-70 |  |  | 100 |
| Hardness, A | 68 | 68 | 70 |
| Transparent | yes | yes | yes |
| Oil Bleed | no | no | no |
| color | none | none | none |
| Tensile Strength | 2646 | 2617 | 2170 |
| Elongation % | 594 | 679 | 550 |
| 50% Modulus | 308 | 282 | 385 |
| 100% Modulus | 432 | 372 | 640 |
| 300% Modulus | 1144 | 929 | 1310 |

EXAMPLE #5

This example shows the effect of increasing TSM concentration on hardness. All formulations were fabricated via injection molding. Formulations 5.2-5.6 were dry blended press-side in the indicated compositions. A TSM concentration of 30 w % reduces the hardness of CDBC #3 from 46 shore D to 73 shore A while maintaining physical properties suitable for many applications. In addition, superb compatibility between the tailored softening modifier and the block copolymer allows for easily tailored properties via press-side blending. The capability for press-side blending presents a formulating advantage by allowing hardness to be easily adjusted without the need for pre-compounding.

TABLE #6

|  | Formulation | | | | | | |
|---|---|---|---|---|---|---|---|
|  | 5.1 | 5.2 | 5.3 | 5.4 | 5.5 | 5.6 | 5.7 |
| Blend #1 |  | 50 |  | 100 |  |  |  |
| Blend #2 |  |  | 25 |  | 50 | 75 | 100 |
| CDBC #3 | 100 | 50 | 75 |  | 50 | 25 |  |
| Additives | 0.3 | 0.3 | 0.3 | 0.35 | 0.38 | 0.43 | 0.46 |
| TSM Concentration (w %) | 0 | 10 | 10 | 20 | 20 | 30 | 40 |
| Shore A Hardness, 10s | 46 D | 93 | 93 | 83 | 84 | 73 | 55 |
| MD Tensile |  |  |  |  |  |  |  |
| 50% Modulus (psi) | 1350 | 970 | 978 | 624 | 690 | 390 | 170 |
| 100% Modulus (psi) | 1350 | 1012 | 1030 | 706 | 764 | 488 | 247 |
| 300% Modulus (psi) | 2700 | 1955 | 2057 | 1353 | 1444 | 1030 | 560 |
| Tensile Strength (psi) | 2930 | 2480 | 2490 | 2095 | 2080 | 1600 | 637 |
| Elongation (%) | 325 | 370 | 355 | 435 | 413 | 480 | 440 |
| TD Tensile |  |  |  |  |  |  |  |
| 50% Modulus (psi) | 1198 | 765 | 772 | 426 | 500 | 311 | 134 |
| 100% Modulus (psi) | 1163 | 752 | 764 | 435 | 503 | 338 | 178 |
| 300% Modulus (psi) | 2327 | 1560 | 1590 | 920 | 1043 | 708 | 428 |
| Tensile Strength (psi) | 3820 | 3190 | 3230 | 2695 | 2740 | 2050 | 890 |
| Elongation (%) | 425 | 495 | 495 | 595 | 565 | 640 | 630 |
| MD Flex Modulus (ksi) | — | — | — | 20.3 | 22.4 | 10.2 | 2.8 |
| TD Flex Modulus (ksi) | — | — | — | 8.4 | 12.7 | 6.1 | 2 |

EXAMPLE #6

This example illustrates the potential utility of formulations containing a CDBC and a TSM for sound or vibration damping applications. FIG. 1 shows the dynamic mechanical spectra of formulation 5.7. The use of a tailored softening modifier surprisingly results in a tan δ>0.25 over a very broad temperature range (−30 to 80° C.). This suggests that the material is dissipating or absorbing more energy than is being stored. Since many molded or extruded goods have a use temperature within this range, this formulation may be suitable for damping applications.

EXAMPLE #7

This example illustrates the utility of unhydrogenated block copolymers in conjunction with tailored softening modifiers for use in elastic film applications. KRATON D-1102, KRATON D-1164, and KRATON D-1114 all have suitable properties for elastic film depending on the specific application. Even though Blend #6 has a relatively high styrene content it surprisingly has very similar stiffness compared to D-1164, which is an SIS polymer. Blend #5 has essentially the same styrene content as Blend #6 but is softer due to a controlled distribution of styrene in the midblock. Surprisingly, Blend #5 has similar stiffness to that of D-1114, which is also an SIS with only 19% styrene.

TABLE #7

| | Formulation | | | | |
|---|---|---|---|---|---|
| | 7.1 | 7.2 | 7.3 | 7.4 | 7.5 |
| Blend #5 | 100 | | | | |
| Blend #6 | | 100 | | | |
| D-1102 | | | 100 | | |
| D-1164 | | | | 100 | |
| D-1114 | | | | | 100 |
| Tensile Properties | | | | | |
| 50% Modulus, psi | 46 | 162 | 231 | 185 | 54 |
| 100% Modulus, psi | 62 | 195 | 258 | 235 | 75 |
| 300% Modulus, psi | 122 | 400 | 379 | 422 | 125 |
| Tensile Strength, psi | 1075 | 2205 | 2705 | 4140 | 2135 |
| Elongation, % | 1115 | 910 | 1215 | 1530 | 1935 |

What is claimed is:

1. A block copolymer composition comprising:
 (a) 100 parts by weight of a solid block copolymer wherein:
  (i) said block copolymer comprises at least two A blocks and at least one B block, each A block independently selected from mono alkenyl arene polymer blocks and each B block independently selected from
   (1) polymer blocks having at least one conjugated diene and at least one mono alkenyl arene and having a random distribution; and
   (2) polymer blocks having at least one conjugated diene and at least one mono alkenyl arene and having a controlled distribution;
  (ii) each A block having a peak molecular weight between about 3,000 and about 60,000 and each B block having a peak molecular weight ($MW_1$) between about 20,000 and about 200,000;
  (iii) the total amount of mono alkenyl arene in the block copolymer is about 30 percent weight to about 85 percent weight; and
  (iv) the weight percent of mono alkenyl arene in each B block ($S_1$) is between about 5 percent and about 75 percent; and
 (b) 5 to 250 parts by weight of a tailored softening modifier which comprises a conjugated diene and is structurally related to the character of the B block of said block copolymer wherein:
  (i) the ratio ($MW_2$)/($MW_1$) of the peak molecular weight of said softening modifier ($MW_2$) to the peak molecular weight of said B block of said block copolymer ($MW_1$) is 0.01 to 1.0, with a minimum molecular weight ($MW_2$) of 2,000;
  (ii) the weight percent of mono alkenyl arene in each softening modifier ($S_2$) is between about 5 percent and about 75 percent and the ratio of $S_2/S_1$ is between 0.5 and 1.5; and
 (c) wherein said softening modifier is polymerized in solution in the presence of a solvent in a second reactor to form a second solution and combined with a first solution prepared in a first reactor having a solvent to form a common solution, wherein said block copolymer is polymerized in said first solution or common solution, and
 (d) the solvent is removed from the common solution after polymerization of said block copolymer, providing an intimate mixture of said block copolymer and said tailored softening modifier.

2. The composition according to claim 1 wherein said mono alkenyl arene for the block copolymer and the softening modifier is styrene and said conjugated diene for the block copolymer and the softening modifier is selected from the group consisting of isoprene, 1,3-butadiene and mixtures thereof.

3. The composition according to claim 2 wherein said conjugated diene is 1,3-butadiene and wherein about 5 to about 80 mol percent of the condensed butadiene units in block B and in the softening modifier have 1,2-configuration.

4. The composition according to claim 3 wherein the weight percentage of styrene in the B block and in the softening modifier is between about 40 percent and about 75 percent.

5. The composition according to claim 4 wherein said block A has a molecular weight of between 5,000 and 45,000, said block B is a controlled distribution block and has a molecular weight of between 20,000 and 200,000, said softening modifier has a molecular weight of between 2,000 and 60,000 and has a controlled distribution structure, and said softening modifier and said B block have a blockiness index of between about 0 percent and 80 percent.

6. The composition according to claim 5 wherein said first solution and second solutions are combined after polymerization of both the block copolymer and the tailored softening modifier, and prior to finishing.

7. The composition according to claim 5 wherein said second solution is added to said first solution prior to polymerization of said block copolymer.

8. The composition according to claim 5 wherein said second solution is added to said first solution during the polymerization of said block copolymer.

9. A block copolymer composition comprising:
 (a) 100 parts by weight of a solid block copolymer wherein:
  (i) said block copolymer comprises at least two A blocks and at least one B block, each A block independently selected from mono alkenyl arene polymer blocks and each B block independently selected from
   (1) polymer blocks having at least one conjugated diene and at least one mono alkenyl arene and having a random distribution; and (2) polymer blocks having at least one conjugated diene and at least one mono alkenyl arene and having a controlled distribution;

(ii) each A block having a peak molecular weight between about 3,000 and about 60,000 and each B block having a peak molecular weight ($MW_1$) between about 20,000 and about 200,000;

(iii) the total amount of mono alkenyl arene in the block copolymer is about 30 percent weight to about 85 percent weight; and (iv) the weight percent of mono alkenyl arene in each B block ($S_1$) is between about 5 percent and about 75 percent; and (b) 5 to 250 parts by weight of a tailored softening modifier which comprises a conjugated diene and is structurally related to the character of the B block of said block copolymer wherein:

(i) the ratio ($MW_2$)/($MW_1$) of the peak molecular weight of said softening modifier ($MW_2$) to the peak molecular weight of said B block of said block copolymer ($MW_1$) is 0.01 to 1.0, with a minimum molecular weight ($MW_2$) of 2,000;

(ii) the weight percent of mono alkenyl arene in each softening modifier ($S_2$) is between about 5 percent and about 75 percent and the ratio of $S_2/S_1$ is between 0.5 and 1.5; and (c) wherein said block copolymer is formed in solution in a reactor in the presence of a solvent and said tailored softening modifier is formed in the same solution in the same reactor; and (d) the solvent is removed from the solution, providing an intimate mixture of said block copolymer and said tailored softening modifier.

10. The composition according to claim 9 wherein said mono alkenyl arene for the block copolymer and the softening modifier is styrene and said conjugated diene for the block copolymer and the softening modifier is selected from the group consisting of isoprene, 1,3-butadiene and mixtures thereof.

11. The composition according to claim 10 wherein said conjugated diene is 1,3-butadiene and wherein about 5 to about 80 mol percent of the condensed butadiene units in block B and in the softening modifier have 1,2-configuration.

12. The composition according to claim 11 wherein the weight percentage of styrene in the B block and in the softening modifier is between about 40 percent and about 75 percent.

13. A formulated composition comprising the composition of claim 1 and at least one component selected from the group consisting of fillers, reinforcements, polymer extending oils, tackifying resins, lubricants, stabilizers, styrene polymers, antioxidants, styrene/diene block copolymers and polyolefins.

14. A formulated composition comprising the composition of claim 9 and at least one component selected from the group consisting of fillers, reinforcements, polymer extending oils, tackifying resins, lubricants, stabilizers, styrene polymers, antioxidants, styrene/diene block copolymers and polyolefins.

15. An article comprising the composition of claim 13, wherein said article is formed in a process selected from the group consisting of injection molding, over molding, dipping, extrusion, roto molding, slush molding, fiber spinning, film making or foaming.

16. An article comprising the composition of claim 13, wherein said article is selected from the group consisting of closures, synthetic corks, cap seals, tubing, food containers, beverage containers, interior automotive parts, window gaskets, elastic films, foamed products, bicomponent fibers, monofilaments, adhesives, cosmetics and medical goods.

17. The composition according to claim 1 wherein said second solution is added to said first solution after polymerization of said block copolymer.

* * * * *